(12) United States Patent
Haubner et al.

(10) Patent No.: US 7,586,011 B2
(45) Date of Patent: Sep. 8, 2009

(54) METHOD FOR THE PRODUCTION OF TETRAHYDROFURAN COPOLYMERS

(75) Inventors: Martin Haubner, Eppelheim (DE); Rolf Pinkos, Bad Dürkheim (DE)

(73) Assignee: BASF SE, Ludwigshafen (DE)

( * ) Notice: Subject to any disclaimer, the term of this patent is extended or adjusted under 35 U.S.C. 154(b) by 595 days.

(21) Appl. No.: 10/537,962

(22) PCT Filed: Dec. 16, 2003

(86) PCT No.: PCT/EP03/14284

§ 371 (c)(1),
(2), (4) Date: Jun. 9, 2005

(87) PCT Pub. No.: WO2004/055094

PCT Pub. Date: Jul. 1, 2004

(65) Prior Publication Data

US 2006/0052550 A1    Mar. 9, 2006

(30) Foreign Application Priority Data

Dec. 18, 2002    (DE) ............... 102 59 136

(51) Int. Cl.
*C07C 43/00*    (2006.01)
(52) U.S. Cl. .............. 568/624; 568/619; 568/620
(58) Field of Classification Search .............. 568/624, 568/619, 620
See application file for complete search history.

(56) References Cited

U.S. PATENT DOCUMENTS 5,395,959 A * 3/1995 Weyer et al. ............. 560/231

FOREIGN PATENT DOCUMENTS

| DE | 41 08 047 A1 | 9/1992 |
| EP | 0 126 471 A2 | 11/1984 |
| EP | 0 158 229 A1 | 10/1985 |
| EP | 0 503 392 A2 | 9/1992 |
| EP | 1361243 A1 * | 11/2003 |
| JP | H10-87811 | 4/1998 |

OTHER PUBLICATIONS

A. Weissberger, B.W. Rossiter (ed.); Techniques of Chemistry; vol. 1; pp. 163-204, Wiley Interscience 1971.

* cited by examiner

*Primary Examiner*—Daniel M Sullivan
*Assistant Examiner*—Sudhakar Katakam
(74) *Attorney, Agent, or Firm*—Connolly Bove Lodge & Hutz LLP

(57) ABSTRACT

The present invention provides a process for preparing polyoxyalkylene glycols of a certain molecular weight in one stage by copolymerizing tetrahydrofuran and alpha,omega-diols as the comonomer in the presence of a heteropolyacid and of a hydrocarbon, by distilling off a mixture of water and this hydrocarbon from the copolymerization, which comprises terminating the polymerization when this molecular weight is attained by adding water, comonomer, butanediol or butanediol-water mixtures.

10 Claims, 1 Drawing Sheet

Figure I
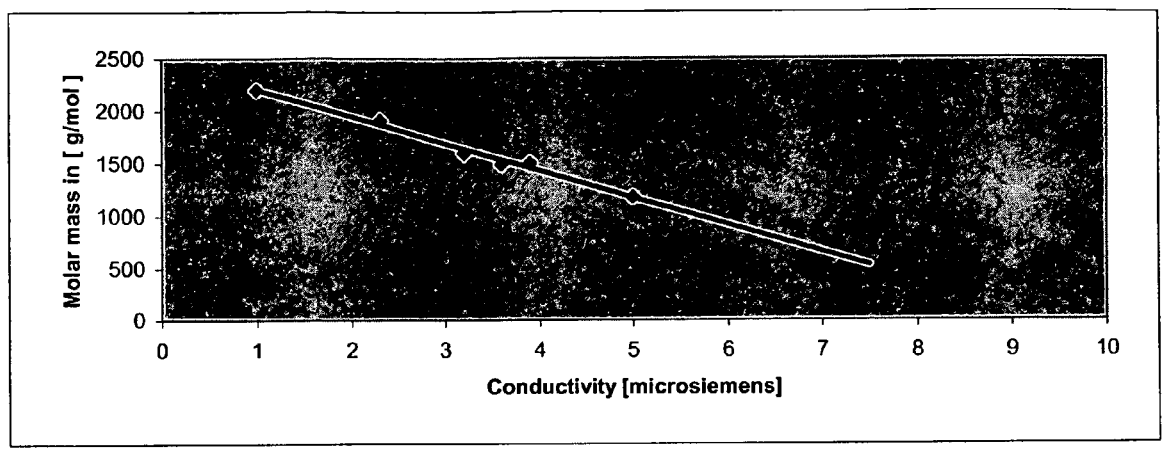

METHOD FOR THE PRODUCTION OF TETRAHYDROFURAN COPOLYMERS

CROSS REFERENCE TO RELATED APPLICATION

The present application is a National Stage application of PCT/EP2003/014284, filed Dec. 16, 2003, which claims priority from German Patent Application No. DE 102 59 136.9, filed Dec. 18, 2002.

TECHNICAL FIELD

The present invention relates to a novel process for preparing polyoxyalkylene glycols (polyalkylene ether glycols) by copolymerizing tetrahydrofuran and alpha,omega-diols in the presence of a heteropolyacid and of a hydrocarbon, by distilling off a mixture of water and this hydrocarbon from the copolymerization and, after complete copolymerization, adding butanediol, butanediol-water mixture and/or comonomer.

BACKGROUND

Polyoxyalkylene glycols are important starting materials for the production of elastic fibers, elastic construction materials and coatings. They are prepared by polymerizing tetrahydrofuran (referred to hereinbelow as "THF") or by copolymerization of THF with oxiranes such as ethylene oxide or propylene oxide or with alpha,omega-diols in the presence of cationic catalysts. EP-A 126 471, for example, discloses the use of heteropolyacids as catalysts. This process makes polyalkylene ether glycols accessible in one stage, whereas other processes initially provide the esters of the polyoxyalkylene glycols which still have to be hydrolyzed to the polyoxyalkylene glycols before their use in the field of polymers.

The determination of a certain target molecular weight in the heteropolyacid-catalyzed THF polymerization by controlling the amount of, and appropriately metering in the amount present in the polymerization system of, proton-donating compounds such as water in the course of the polymerization via measurement of the electrical conductivity is disclosed by DE-A 41 08 047.

A batchwise process for preparing THF copolymers using alpha,omega-diols in the presence of a heteropolyacid is disclosed by JP-A 10-87811. In this process, a portion of the copolymerizetion solution is continuously withdrawn from the polymerization reactor and subjected to a process for water removal. After 12 h, the polymerization is stopped. For the repetition of the experiment four times as described, fresh catalyst is used each time. This is uneconomic, since fresh catalyst has to be dried for each new polymerization.

It has been found that the heteropolyacid phase of the copolymerization mixture changes depending on the phase separation time and duration for the recycling. Viscosity and color increase, which affects firstly the quality of the polymerization product, for example the color of the end product, and secondly the properties of the heteropolyacid, for example pumpability, emulsifiability, on-stream time, but also the catalytic properties.

It is an object of the present invention to make the copolymerization of THF with alpha,omega-diols in the presence of heteropolyacids more simple and economic by providing copolymers of a certain molecular weight and finding a means of repeatedly using and recycling the catalyst.

The novel process should additionally provide polyoxyalkylene glycols with incorporation rates of the diol comonomer of from 5 to 40% by weight, based on the copolymer.

SUMMARY OF THE DISCLOSURE

We have found that this object is achieved, surprisingly, by a process for preparing polyoxyalkylene glycols of a certain molecular weight in one stage by copolymerizing tetrahydrofuran (THF) and alpha,omega-diols as the comonomer in the presence of a heteropolyacid and of a hydrocarbon, by distilling off a mixture of water and hydrocarbon from the copolymerization, which comprises terminating the polymerization when this molecular weight is attained by adding water, comonomer, butanediol or butanediol-water mixtures.

The novel process allows THF copolymers of a certain molecular weight to be prepared simply and reliably. The use of water, comonomer, butanediol or butanediol-water mixtures to terminate the copolymerization makes possible not only synthesis of THF copolymers of certain molecular weights, but results in a heteropolyacid-containing catalyst phase which can be reused, for example by recycling. The termination according to the invention of the copolymerization results in an effectively stabilized heteropolyacid which remains colorless, stable and catalytically active even on prolonged intermediate storage.

BRIEF DESCRIPTION OF THE DRAWINGS

FIG. 1 is a graphical representation of electrical conductivity value correlated with the average molecular weight of the copolymer being formed for the dodecatungstophosphoric acid/neopentyl glycol/THF/water/hexane reaction system.

DETAILED DESCRIPTION OF THE DISCLOSURE

According to the invention, the copolymerization is terminated by adding from 0.1 to 20% by weight of water, comonomer, butanediol and/or butanediol-water mixture, preferably from 0.1 to 10% by weight, more preferably from 0.1 to 5% by weight, based in each case on the total amount of tetrahydrofuran, comonomer and heteropolyacid already used for the copolymerization before the termination of the copolymerization on attainment of the desired molecular weight of the target polymer. Preference is given to adding comonomer, butanediol, butanediol-water mixture, particular preference to adding butanediol or butanediol-water mixture. This allows the electrical conductivity of the copolymerization mixture to be correlated to the average molecular weight of the polymer forming. The possibility therefore exists of targeted termination of the copolymerization on attainment of a certain conductivity value to determine the average molecular weight of the copolymer being formed in a targeted manner while maintaining a narrow molecular weight distribution.

The measurement of the electrical conductivity can, for example, be carried out in the process according to the invention with the aid of techniques, circuits and measuring arrangements as described by T. and L. Shedlovsky in A. Weissberger, B. W. Rossiter (Ed.) Techniques of Chemistry, Volume I, pages 163-204, Wiley-Interscience, New York, 1971. Useful conductivity measuring instruments and conductivity measuring cells which can be used successfully in the process according to the invention also include the commercially available instruments and electrodes. The measuring electrodes used may be the customary platinum electrodes.

Prolonged operation may result in the electrodes becoming coated in the course of time with polymer or by-products of the polymerization reaction and the measurements thus being distorted. It is therefore appropriate to check the function of the electrodes and to clean the electrodes when required.

The conductivity can be measured in the homogeneous reaction mixture, the catalyst phase or else in the organic phase. The latter two possibilities would arise when the reactor comprises a rest zone which allows phase separation.

The electrical conductivity value can be correlated with the average molecular weight of the copolymer being formed, but is strongly temperature-dependent and dependent on the organic hydrocarbon (azeotroping agent) used in each case. Taking into consideration the particular heteropolyacid used, the comonomer used and the polymerization temperature employed, this results in a virtually linear relationship between the electrical conductivity measured and the average molecular weight of the polymer formed. Such a relationship is illustrated by way of example in FIG. 1 for the dodecatungstophosphoric acid/neopentyl glycol/THF/water/hexane reaction system at a polymerization temperature of 60° C.

In the process according to the invention, by which THF copolymers of average molecular weight from 1000 to 2800 are obtainable, this means a termination of the copolymerization at a conductivity between 0.1 and 5 µS, preferably between 0.1 and 3 µS and more preferably between 0.1 and 2.5 µS. For better stabilization of the organic product phase before oxidative damage, 10-500 ppm, more preferably 50-300 ppm, of a radical scavenger can be added to it. A particularly suitable radical scavenger is 250 ppm of 2,6-di-tert-butyl4-methylcresol (BHT).

In this application, the term "average molecular weight" or "average molar mass" refers to the number-average molecular weight $M_n$ of the copolymers present in the polymer formed.

The catalyst phase resulting from phase separation after termination of the copolymerization is stable and can be stored for a prolonged period and if required reused for further copolymerizations. A catalyst phase obtained from a preceding experiment can be reused in the next copolymerization experiment, but before reuse has to be freed of water, comonomer, butanediol or butanediol-water,mixture added for termination. This can be effected, for example, by distillation.

The copolymerization of THF with alpha,omega-diols releases water of reaction. Since water firstly adversely affects the catalyst activity and secondly acts as a chain-termination reagent (known as a "telogen"), it is necessary to remove the water of reaction and also the water of crystallization from the copolymerization stage to achieve a certain molecular weight.

The hydrocarbons used in the process according to the invention should be suitable for azeotrope formation with water. Useful hydrocarbons are, for example, aliphatic or cycloaliphatic hydrocarbons having from 4 to 12 carbon atoms or aromatic hydrocarbons having from 6 to 10 carbon atoms or mixtures thereof. Specific mention is made, for example, of pentane, hexane, heptane, octane, decane, cyclopentane, cyclohexane, benzene, toluene, xylene or naphthalene, and among these preference is given to pentane, cyclopentane, hexane and octane, and particular preference to pentane.

The hydrocarbons are added to the copolymerization mixture (consisting of THF and neopentyl glycol (NPG)) at the beginning of the reaction in an amount of from $1\times10^{-4}$% by weight (corresponding to 1 ppm) to 30% by weight, based on the reaction mixture composed of alpha,omega-diol and THF, preferably from 1 ppm to 16% by weight, more preferably from 1 ppm to 10% by weight. However, it is also possible to introduce the hydrocarbon into the top of the distillation column to remove the mixture of hydrocarbon and water. The total amount of water which is discharged from the copolymerization can be used to adjust the particular molar mass.

Useful comonomers are alpha,omega-diols apart from 1,4-butanediol, for example $C_2$- to $C_{10}$-alkanediols such as ethylene glycol, propylene glycol, 1,3-propanediol, 1,3-butanediol, 2-methylbutanediol, 1,5-pentanediol, 1,6-hexanediol, neopentyl glycol, 3-methyl-1,5-pentanediol, 1,8-octanediol, 1,10-decanediol, diethylene glycol, triethylene glycol, low molecular weight THF copolymers with the alpha,omega-diols mentioned here having an average molecular weight of from 200 to 600 dalton or mixtures thereof. The comonomers used are preferably low molecular comonomers having an average molecular weight of from 200 to 600 dalton and neopentyl glycol, more preferably neopentyl glycol. For the purposes of this invention, 1,4-butanediol is not a comonomer, since it leads to the polytetrahydrofuran homopolymer and does not give a copolymer.

It is also possible to use mixtures of tetrahydrofuran, water and 2-methylbutanediol, and the proportion of 2-methylbutanediol in such mixtures may be between 100 ppm and 60% by weight, based on the mixture.

According to the invention, from 1 to 60% by weight of the alpha,omega-diol, based on the tetrahydrofuran used, preferably from 2 to 40% by weight, more preferably from 3 to 20% by weight, are used in the copolymerization.

The THF is copolymerized with alpha,omega-diols in the presence of heteropolyacids as catalysts in a manner known per se, as described, for example, in EP-A 126 471.

Heteropolyacids which are used in accordance with the invention are inorganic polyacids which, in contrast to isopolyacids, have at least two different central atoms. Heteropolyacids are formed from polybasic oxygen acids, each of which are weak, of a metal such as chromium, molybdenum, vanadium and tungsten, and also of a nonmetal such as arsenic, iodine, phosphorus, selenium, silicon, boron and tellurium, as partial mixed anhydrides. Examples include dodecatungstophosphoric acid $H_3(PW_{12}O_{40})$ or decamolybdophosphoric acid $H_3(PMo_{12}O_{40})$. As the second central atom, the heteropolyacids may also contain actionides or lanthanoids (see Z. Chemie 17 (1977), pages 353 to 357 or 19 (1979), 308). The heteropolyacids can be generally described by the formula $H_{8-n}(Y''M_{19}O_{40})$ where n=valency of the element Y (for example boron, silicon, zinc) (see also Heteropoly- and Isopolyoxometalates, Berlin; Springer 1983). Catalysts which are particularly suitable for the process according to the invention are phosphotungstic acid, phosphomolybdic acid, silicomolybdic acid and silicotungstic acid.

The heteropolyacids used as catalysts in the copolymerization may be used either dried (from 1 to 10 mol of water/mol of heteropolyacid) or undried (from 10 to 40 mol of water/mol of heteropolyacid).

The water present in the copolymerization reactor which is partly water of crystallization from the heteropolyacid and partly water formed during the reaction is removed with the aid of a customary distillation apparatus directly from the copolymerization, i.e. from the copolymerization reactor without intermediate work-up steps such as phase separations, as a mixture with the hydrocarbon added with the fresh feed with water, at a temperature of from 40 to 120° C., more preferably from 50 to 70° C., and a pressure of from 150 mbar to 2 bar, preferably 230 mbar.

The vapors formed are preferably condensed in a surface condenser; however, quenches and injection condensers are also possible. The resulting condensate is fed to solvent work-up to separate the water. It is particularly advantageous to at least partly recycle the condensate into the reactor, i.e. to remove the heat of reaction by means of evaporative cooling. To achieve very high water contents in the condensate to be removed, another multistage countercurrent rectification column charged with the recycle condensate as reflux can be inserted between reactor and condenser.

In a further embodiment, THF is distilled off at the same time as the mixture of the hydrocarbon used in the copolymerization with water, which, depending on the hydrocarbon, may form a ternary azeotrope.

The hydrocarbon distilled off in a mixture with water or the mixtures of water and hydrocarbon with tetrahydrofuran may be dried with a suitable solid adsorbent, for example over molecular sieves, and recycled into the copolymerization. Phase separation into an aqueous phase and a hydrocarbon phase is also conceivable. The aqueous phase contains up to 5% by weight of THF, preferably <1% by weight. It also contains the respective hydrocarbon in concentrations of <1% by weight. THF and the hydrocarbon may be recovered by distillative work-up of the aqueous phase and recycled. However, the aqueous phase may also be discarded.

In the copolymer solution (containing THF, heteropolyacid and copolymer) remaining after removal of the hydrocarbon/water mixture, the conductivity is determined until the desired value has been attained. The copolymerization is then terminated by adding the amount of water, comonomer, butanediol and/or butanediol-water mixture required in accordance with the invention. Afterwards, the copolymer solution is preferably transferred to a phase separator. By adding further amounts of hydrocarbon, the heteropolyacid is removed from the product phase. This process known per se, for example from EP-A 181 621, leads to postprecipitation of the heteropolyacid from the organic phase. The hydrocarbon used is preferably the hydrocarbon already used in the copolymerization.

The upper organic phase contains the majority of the copolymer and THF and also smaller residual amounts of heteropolyacid or its subsequent products. Their content generally does not exceed 0.03% by weight, based on the copolymerization effluent. Nevertheless, it has been recognized that these residual amounts of the catalyst and its subsequent products have to be removed, since they adversely affect the properties of the copolymers for their further use.

The THF can be distillatively removed from the copolymer before or after the removal of the catalyst fractions and/or subsequent catalyst products by filtration, for example ultrafiltration, adsorption on solid adsorbents and/or with the aid of ion exchangers, although preference is given to filtration and adsorption on solid adsorbents. Preference is given to filtering without preceding removal of the THF by distillation.

The adsorption on the solid adsorbents mentioned may also be combined with a neutralization of the polymerization effluent by bases. Useful bases include, for example, the hydroxides and carbonates of the alkali metals and alkaline earth metals.

The adsorption is effected preferably on activated carbon and/or metal oxides and/or ion exchangers, at temperatures of from 10 to 75° C., preferably from 20 to 70° C. Particular preference is given to effecting the removal in work-up stage a) on ion exchangers and/or activated carbon. Preferred metal oxides are sodium hydroxide, aluminum oxide, silicon dioxide, titanium dioxide, zirconium dioxide, lanthanum oxide and/or calcium oxide.

Suitable activated carbon may, for example, be obtained from Merck, Darmstadt, or in the form of the commercially available CPG UF 8×30 activated carbon from Chemviron Carbon.

Suitable ion exchangers are, for example, anion exchangers such as the commercially available Lewatit® MP 600R which may be obtained from Bayer AG, Leverkusen, mixed ion exchangers, for example the commercially available SerdolitR® which may be obtained from Serva, Heidelberg, or molecular sieves having pore sizes of from 3 to 10 Å.

The removal according to the invention of the catalyst fractions and/or subsequent catalyst products by adsorption on solid adsorbents is preferably carried out in a fixed bed at an hourly space velocity of generally from 0.2 to 5 kg/l*h, in particular from 0.4 to 4 kg/l*h (kg of polymerization effluent per liter of adsorbent per hour).

The process according to the invention may be carried out batchwise, semibatchwise or continuously. The preferred variant is batchwise.

In the case of the continuous method, fresh THF monomer is metered into the reactor via a fill level regulator in the presence of water (0.1-5% by weight, preferably 0.1-3.5% by weight, more preferably 0.1-2% by weight, of THF, based on the total amount of THF monomer and comonomer, for example neopentyl glycol). Advantageously, fresh feed solution is fed at the rate at which product and unconverted monomer are discharged from the reaction apparatus. In this way, the residence time, and therefore the polymerization time, can be controlled, which provides a further means of influencing and adjusting the average molecular weight of the polymer being formed. Depending on the amount of catalyst and the reaction temperature in the batchwise process, the copolymerization is generally carried out over a period of from 0.5 to 70 hours, preferably from 5 to 50 hours and more preferably from 10 to 40 hours. In the case of the continuous process, residence times of from 1 to 50 hours and preferably from 10 to 40 hours, are typically set. At the beginning of a continuous reaction, the reaction system described requires a certain amount of time until a steady-state equilibrium has been established, and during this time it may be advantageous to keep the reactor outlet closed, i.e. to discharge no product solution from the reaction apparatus. The conductivity can be measured continuously with the aid of a conductivity measuring cell disposed in the copolymerization solution.

For the batchwise, semibatchwise and continuous method, the heteropolyacid is advantageously used in amounts of from 1 to 300 parts by weight, preferably from 5 to 150 parts by weight, based on 100 parts by weight of the monomers used (THF monomer and alpha,omega-diol comonomer). It is also possible to add relatively large amounts of heteropolyacid to the reaction mixture.

The heteropolyacid can be fed to the reaction in solid form, whereupon contacting with the further reactants results in it gradually going into the liquid catalyst phase. Another procedure is to slurry the solid heteropolyacid with the alpha, omega diol to be used and/or the THF and pass the resulting catalyst solution into the reactor as a liquid catalyst phase. Even the catalyst phase or the monomeric starting material can be initially charged in the reactor. However, both components can also be introduced into the reactor at the same time.

The copolymerization is typically carried out at temperatures of from 20 to 100° C., preferably from 30 to 80° C. Preference is given to working under atmospheric pressure, although reaction under pressure, especially under the autogenous pressure of the reaction system, may equally prove convenient and advantageous.

In the batchwise, semibatchwise method and the continuous procedure, the reactors should be equipped with efficient mixing apparatus, for example stirrers.

Suitable reactors are any reactors which are known to those skilled in the art and have internal and/or external free liquid surface area for the necessary vaporization of the water-containing vapors in which sufficiently high shear forces are achieved in the liquid to suspend the catalyst phase in the homogeneous monomer/polymer phase (stirred tanks, circulation reactors, jet loops, pulsed internals). A particularly advantageous design is the configuration as a jet loop, since the necessary heating of the reactor can be integrated here in a simple manner into the liquid circulation stream. The water-containing mixture of the hydrocarbon is evaporated out of the reaction mixture continuously or batchwise and the water content of the reactor contents is thus set to values advantageous from the point of view of the reaction.

The process according to the invention is advantageously carried out under an inert gas atmosphere, and any desired inert gases such as nitrogen or argon can be used. The reactants are freed before use of any water and peroxides contained therein.

The reaction can be performed in conventional reactors or reactor arrangements suitable for continuous processes, for example in tubular reactors which are equipped with internal fitments which ensure good mixing of the emulsion-like copolymerization mixture, or else in stirred tank batteries.

The process according to the invention can provide polyoxyalkylene glycols, in particular copolymers of THF and neopentyl glycol, economically and in good yield, selectively and with a narrow molecular weight distribution, and also in pure form. The copolymers have incorporation rates of the alpha,omega-diol comonomer of from 10 to 50% by weight, based on the copolymer, and average molecular weights $M_n$ of from 600 to 6000. The polyoxyalkylene glycols which can be prepared according to the invention find use, for example, for preparing special polyurethanes which are suitable as highly elastic composite materials. A polyurethane polymer which contains the copolymers which can be prepared in accordance with the invention has a high elongation at break, a small change in the stress on elongation, a small hysteresis loss on expansion and contraction and also a high elasticity even in extreme cold.

The invention is illustrated by the examples which follow.

EXAMPLES

Determination of the Color Number

The polymers freed of solvent are analyzed untreated in a Dr. Lange LICO 200 calorimeter. 100-QS precision cuvettes (layer thickness 50 mm, Helma) are used.

Determination of the OH Number

The hydroxyl number is that amount of potassium hydroxide in mg which is equivalent to the amount of acetic acid bound in the acetylation of 1 g of substance. The hydroxyl number is determined by the esterification of the hydroxyl groups present with an excess of acetic anhydride. After the reaction, the excess acetic anhydride is hydrolyzed with water and back-titrated as acetic acid with sodium hydroxide solution.

Copolymerization Ratio Determination

The copolymerization ratio was determined by $^1$H NMR using a Bruker dpx 400 instrument; 400 MHz, log. Standard: tetramethylsilane (TMS) using the solvent $CDCl_3$.

To calculate the incorporation rate, the integrals I of the methyl group signals of neopentyl glycol (NPG) (0.8-1.1 ppm) and of the internal $CH_2$ groups of the polytetrahydrofuran units (1.4-2.0 ppm) are used:

$$\frac{I_{NPG} \times 4}{I_{THF} \times 6} = \text{incorporation rate}$$

Determination of the Conductivity

Electrode: LTA 01 glass/platinum 2-electrode measuring cell, K approx. 0.1 $cm^{-1}$; from Knick Conductometer (evaluation unit) WTW Knick 702

From the current measured, the measuring instrument initially calculates the conductance of the solution analyzed on the basis of Ohm's law and, taking into account the cell constant, the conductivity. The temperature adjustment is effected manually on the evaluation unit.

Example 1

In a 2 l jacketed reactor equipped with a magnetic stirrer and attached distillation column (50 cm) with combined water separator, a mixture of 800 g of THF, 48 g of neopentyl glycol and 50 g of pentane was stirred to a homogeneous solution. To this were added 197 g of hydrated dodecaphosphotungstic acid ($H_3PW_{12}O_{40}$*x $H_2O$ where x=20-40 from Merck), with stirring. The temperature of the heating medium (oil) was set to 94° C. The reaction temperature was held at 65° C. The conductivity at the start of the copolymerization was 150 µS.

The THF/pentane/water mixture evaporating off during the reaction was separated in the column. The pentane/water mixture is taken off overhead and condensed in the water separator. The liquid phase of the column consists mainly of THF and is recycled into the polymerization stage. The pentane-water mixture separates into two phases, and the upper organic phase runs back into the top of the column. The lower aqueous phase is discarded. During the reaction, 19 g of water were removed.

After 22 h, the reaction was terminated at a conductivity of 2.1 µS by adding 5 g of water and 250 ppm of 2,6-di-tert-butyl-p-cresol (BHT) and 600 g of hexane. After completed phase separation, the lower aqueous catalyst phase (236 g) is discharged and stored for three days.

The upper phase (809 g) was passed at 20° C. over a fixed bed charged with an anion exchanger (volume: 1 l) of the Bayer Lewatit® MP 600 R brand.

Afterwards, THF and heptane were removed on a rotary evaporator at 140° C. and a pressure of 20 mbar to obtain a copolymer having an OH number of 60 mg of KOH/g of copolymer. The NPG incorporation rate was 11.4 mol %. Further data can be taken from Table 1.

Example 2

The aqueous heteropolyacid phase removed from Example 1 is used in Experiment 2. The initial conductivity is 42 µS. After a running time of 18 h and a conductivity of 2.1 µS, the reaction is terminated. The work-up delivers 236 g of an aqueous HPA phase. Further data are listed in Table 1.

Comparative Example C1

The aqueous heteropolyacid phase removed from Example 2 is used in Comparative Example 1. The initial conductivity is 27 µS. After a running time of 22 h and a conductivity of 2.1 µS, the reaction is terminated by switching off heater and stirrer.

The work-up delivers 240 g of an aqueous HPA phase which is stored for three days. Further data are listed in Table 1. The recovered heteropolyacid phase became solid after 3 days, could no longer be recycled and could no longer be used. The color of the heteropolyacid phase changed from colorless to dark blue.

| Ex. | THF [g] | NPG [g] | HPA[1] phase [g] | Temp. [° C.] | Running time [h] | Addition of water at end of reaction [g] | Conductivity [µS] | EVR [%] | OH No. | NPG incorp. [mol %] | Color No. |
|---|---|---|---|---|---|---|---|---|---|---|---|
| 1 | 800 | 48 | 197* | 65 | 21 | 5 | 2.1 | 34 | 60 | 11.4 | 10 |
| 2 | 800 | 48 | 236 | 65 | 18 | 10 | 2.2 | 32.5 | 62 | 11.8 | 9 |
| C1 | 800 | 48 | 236 | 65 | 22 | — | 2.1 | 33.6 | 63 | 12.2 | 10 |

[1]HPA = Heteropolyacid
EVR = Evaporation residue

Example 3

In a 1 l jacketed reactor equipped with a magnetic stirrer and attached distillation column (50 cm) with combined water separator, a mixture of 590 g of THF, 30 g of neopentyl glycol and 60 g of hexane was stirred to a homogeneous solution. To this were added 150 g of hydrated dodecaphosphotungstic acid ($H_3PW_{12}O_{40}$*x $H_2O$ where x =20-40 from Merck), with stirring. The temperature of the heating medium (oil) was set to 94° C. The reaction temperature was held at 65° C.

The THF/hexane/water mixture evaporating off during the reaction was separated in the column. The hexane/water mixture is taken off overhead and condensed in the water separator. The liquid phase of the column consists mainly of THF and is recycled into the polymerization stage. The hexane-water mixture separates into two phases, and the upper organic phase runs back into the top of the column. The lower aqueous phase is discarded. During the reaction, 20.7 g of water were removed.

After 19 h, the reaction was terminated at a conductivity of 3.2 µS by adding 5 g of water and 250 ppm of 2,6-di-tert-butyl-p-cresol (BHT) and 600 g of hexane. After completed phase separation, the lower aqueous catalyst phase (208 g) is discharged and stored for three days.

The upper phase (475 g) was passed at 20° C. over a fixed bed charged with an anion exchanger (volume: 1 l) of the Bayer Lewatit® MP 600 R brand.

Afterwards, THF and heptane were removed on a rotary evaporator at 140° C. and a pressure of 20 mbar to obtain a copolymer having an OH number of 70 mg of KOH/g of copolymer. Further data can be taken from Table 2.

Example 4

The aqueous heteropolyacid phase removed from Example 3 is used in Experiment 4. After a running time of 24 h and a conductivity of 3.6 µS, the reaction is terminated by adding 5 g of water. The work-up delivers 199 g of an aqueous HPA phase.

Comparative Example 2

The aqueous heteropolyacid phase removed from Example 4 is used in Comparative Example 2. After a running time of 25 h and a conductivity of 2.3 µS, the reaction is terminated without adding water by switching off the heating. The work-up delivers 170 g of an aqueous HPA phase.

The recovered heteropolyacid phase became solid after 3 days, could no longer be recycled and could no longer be used. The color of the heteropolyacid phase changed from colorless to dark blue.

Further data are listed in Table 2.

| Ex. | THF [g] | NPG [g] | HPA[1] phase [g] | Temp. [° C.] | Running time [h] | Addition of water at end of reaction [g] | Conductivity [µS] | EVR [%] | OH No. |
|---|---|---|---|---|---|---|---|---|---|
| 3 | 590 | 30 | 150* | 65 | 19 | 5 | 3.2 | 30.0 | 70 |
| 4 | 590 | 30 | 199 | 65 | 24 | 5 | 3.6 | 29.6 | 75 |
| C 2 | 590 | 30 | 169 | 65 | 25 | — | 2.3 | 33.4 | 58 |

[1]HPA = Heteropolyacid
EVR = Evaporation residue

We claim:

1. A process for preparing polyoxyalkylene glycols comprising copolymerizing, in one stage, tetrahydrofuran and alpha, omega-diols with the exception of butanediol as the comonomer in the presence a heteropolyacid and of a hydrocarbon, distilling off a mixture of water and the hydrocarbon from the copolymerization, and terminating the polymerization by adding water when a molecular weight of from 1,000 to 2,800 is attained.

2. The process as claimed in claim 1, wherein between 0.1 and 10% by weight of water, based on the total amount of tetrahydrofuran, comonomer and heteropolyacid already used for the copolymerization, is added.

3. The process as claimed in claim 1, wherein the attainment of the molecular weight is determined by measuring the electrical conductivity of the copolymerization mixture.

4. The process as claimed in claim 3, wherein the water is added at a conductivity of from 0.1 to 5 µS.

5. The process as claimed in claim 1, wherein the alpha, omega-diol used is neopentyl glycol.

6. The process according to claim 2, wherein the attainment of the molecular weight is determined by measuring the electrical conductivity of the copolymerization mixture.

7. The process according to claim 6, wherein the water is added at a conductivity of from 0.1 to 5 μS.

8. The process according to claim 2, wherein the alpha, omega-diol used is neopentyl glycol.

9. The process according to claim 3, wherein the alpha, omega-diol used is neopentyl glycol.

10. The process according to claim 4, wherein the alpha, omega-diol used is neopentyl glycol.

* * * * *